(12) United States Patent
Chatelois et al.

(10) Patent No.: US 11,867,126 B2
(45) Date of Patent: Jan. 9, 2024

(54) GAS TURBINE ENGINE AND METHOD OF OPERATION

(71) Applicant: PRATT & WHITNEY CANADA CORP., Longueuil (CA)

(72) Inventors: Bruno Chatelois, Boucherville (CA); Michel Desjardins, St-Hubert (CA); Paul Weaver, Chateauguay (CA); Eric Durocher, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 121 days.

(21) Appl. No.: 17/373,849

(22) Filed: Jul. 13, 2021

(65) Prior Publication Data
US 2023/0016164 A1   Jan. 19, 2023

(51) Int. Cl.
*F02C 7/32* (2006.01)
*F02C 6/20* (2006.01)
*F02C 7/36* (2006.01)

(52) U.S. Cl.
CPC .............. *F02C 7/32* (2013.01); *F02C 6/206* (2013.01); *F02C 7/36* (2013.01); *F05D 2220/323* (2013.01); *F05D 2220/74* (2013.01); *F05D 2220/76* (2013.01)

(58) Field of Classification Search
None
See application file for complete search history.

(56) References Cited

U.S. PATENT DOCUMENTS

| | | | |
|---|---|---|---|
| 4,270,408 A | 6/1981 | Wagner | |
| 4,829,850 A * | 5/1989 | Soloy | B64D 35/08 74/606 R |
| 5,054,998 A | 10/1991 | Davenport | |
| 8,324,746 B2 | 12/2012 | Bradbrook | |
| 10,400,858 B2 | 9/2019 | Mitrovic et al. | |
| 10,850,863 B2 | 12/2020 | Bisson et al. | |
| 2006/0005544 A1* | 1/2006 | Herlihy | F01D 15/02 60/39.163 |
| 2013/0098052 A1* | 4/2013 | Bedrine | F02C 6/00 60/39.15 |
| 2017/0327238 A1 | 11/2017 | Roever et al. | |
| 2020/0072322 A1* | 3/2020 | Brito | F02C 7/36 |
| 2020/0248632 A1 | 8/2020 | Eque et al. | |
| 2020/0277062 A1 | 9/2020 | Becker et al. | |
| 2020/0307817 A1 | 10/2020 | Dubreuil et al. | |
| 2021/0179286 A1 | 6/2021 | Harvey et al. | |

* cited by examiner

*Primary Examiner* — Kayla Mccaffrey
(74) *Attorney, Agent, or Firm* — Norton Rose Fulbright Canada LLP (57) ABSTRACT

The gas turbine engine can have an engine core; a core output shaft drivable by the engine core; a power output shaft; an auxiliary power shaft; and a reduction gearbox having gears, the gears drivingly connecting the core output shaft to the auxiliary power shaft. The gears can include an epicyclic gearing drivingly connecting the core output shaft and the auxiliary power shaft to the power output shaft. The gas turbine engine can further have a second auxiliary power shaft interconnected to the auxiliary power shaft, the power output shaft, and the core output shaft by the gears.

18 Claims, 8 Drawing Sheets

GAS TURBINE ENGINE AND METHOD OF OPERATION

TECHNICAL FIELD

The application relates generally to gas turbine engines and, more particularly, to reduction gearboxes.

BACKGROUND OF THE ART

Some gas turbine engines such as turboprop and turboshaft engines in particular are equipped with reduction gearboxes to reduce the rotation speed between a turbine engine core and a power output shaft. This can be required, for instance, when the typical rotation speed of a turbine engine core is significantly higher than a desired rotation speed of a propeller or blades mounted to the power output shaft. Some turbofan gas turbine engine systems, such as the one presented in U.S. Pat. No. 4,270,408 for instance, can include a mechanical interlink, such as a cross-over shaft for instance, for power transfer from one of the engines to the other engine. Although former reduction gearboxes, and uses thereof, were satisfactory to a certain degree, there always remains room for improvement.

SUMMARY

In one aspect, there is provided a gas turbine engine comprising an engine core; a core output shaft drivable by the engine core; a power output shaft; an auxiliary power shaft; and a reduction gearbox having an input port receiving the core output shaft, an output port receiving the power output shaft, an auxiliary port receiving the auxiliary power shaft, and gears, the gears drivingly connecting the core output shaft to the auxiliary power shaft, the gears including an epicyclic gearing, the epicyclic gearing drivingly connecting the core output shaft and the auxiliary power shaft to the power output shaft.

In another aspect, there is provided a gas turbine engine system comprising: a first turboprop engine and a second turboprop engine supported by wings on opposite sides of a fuselage, each of said first and second turboprop engines having an engine core; a core output shaft drivable by the engine core; a power output shaft; an auxiliary power shaft; a reduction gearbox having gears drivingly connecting the core output shaft to the auxiliary power shaft, the gears including an epicyclic gearing, the epicyclic gearing drivingly connecting the core output shaft and the auxiliary power shaft to the power output shaft; the turboprop aircraft further comprising a mechanical connexion drivingly connecting the auxiliary power shaft of the first and second turboprop engines to one another; and wherein the epicyclic gearing of one of the first and second turboprop engine reverses an angular rotation direction between the auxiliary power shaft and the power output shaft.

In a further aspect, there is provided a method of operating a gas turbine engine system having a first turboprop engine and a second turboprop engine supported by wings on opposite sides of a fuselage, each of said first and second turboprop engines having an engine core, a core output shaft drivable by the engine core, a power output shaft, an auxiliary power shaft and a reduction gearbox interconnecting the core output shaft, power output shaft and auxiliary power shaft, the reduction gearbox having an epicyclic gearing reduction stage, the method comprising: the auxiliary power shaft of the first turboprop engine driving the power output shaft of the first turboprop engine; the core output shaft of the second turboprop engine driving the power output shaft of the second turboprop engine; the epicyclic gearing reduction stage of the first turboprop engine reversing an angular rotation direction between the corresponding auxiliary power shaft and power output shaft; and the epicyclic gearing reduction stage of the second turboprop engine preserving an angular rotation direction between the corresponding auxiliary power shaft and power output shaft.

In accordance with another aspect, there is provided a gas turbine engine comprising: an engine core; a core output shaft drivable by the engine core; a power output shaft; a first auxiliary power shaft; a second auxiliary power shaft; and a reduction gearbox having gears, the gears drivingly connecting the core output shaft to the first auxiliary power shaft to the second auxiliary power shaft and to the power output shaft.

The gears can include a first reduction stage including a first gear supported concentrically by a first stage shaft, the first stage shaft having an output gear, the core output shaft having a core output gear radially offset from a first rotation axis of the first stage shaft and drivingly meshed with the first gear, the auxiliary power shaft having an auxiliary power gear radially offset from the first rotation axis and drivingly meshed with the first gear, the auxiliary power gear being circumferentially offset from the power output gear relative the first rotation axis, the first stage shaft, core output shaft and auxiliary power shaft being parallel to one another.

The gears can include an epicyclic gearing, the epicyclic gearing drivingly connecting the core output shaft, the first auxiliary power shaft and the second auxiliary power shaft to the power output shaft.

The epicyclic gearing can have a sun gear having a first rotation axis, the sun gear configured to receive power from at least one of the core output shaft and the auxiliary power shaft, a ring gear concentric to the sun gear relative the first rotation axis, a plurality of planet gears individually drivingly meshed between the sun gear and the ring gear, the planet gears circumferentially interspaced from one another around the first rotation axis, a planet carrier individually rotatably receiving each one of the planet gears and holding rotation axes of the planet gears fixed relative to one another, wherein a first one of the planet carrier and the ring gear is secured to a housing of the reduction gearbox and a second one of the planet carrier and the ring gear is made integral to the power output shaft.

A clutch can be provided between the engine core and the core output shaft, the clutch operable to selectively engage or disengage the core output shaft and the engine core.

The gears can further include a first gear having a rotation axis, wherein the first auxiliary power shaft, the second auxiliary power shaft and the core output shaft are parallel to one another and to the rotation axis and have corresponding gears being individually meshed to the first gear and circumferentially distributed around the first gear.

The gears can further include a first gear having a rotation axis, wherein the first auxiliary power shaft, the second auxiliary power shaft and the core output shaft are parallel to one another and to the rotation axis and have corresponding gears, the core output shaft gear and a first one of the first and second auxiliary power shaft gears being individually meshed to the first gear and a second one of the first and second auxiliary power shaft gears being drivingly connected to the first gear via the first one of the first and second auxiliary power shaft gears.

The first auxiliary power shaft can be drivingly connected to an auxiliary power shaft of another gas turbine engine via a mechanical connexion.

The second auxiliary power shaft can be drivingly connected to an electric machine.

The engine core can have, in fluid flow communication, an inlet, a compressor section, a combustor section, a turbine section and an exhaust section, the core output shaft being drivingly connected to the turbine section.

In accordance with another aspect, there is provided a gas turbine engine system comprising: a first turboprop engine and a second turboprop engine supported by wings on opposite sides of a fuselage, each of said first and second turboprop engines having an engine core; a core output shaft drivable by the engine core; a power output shaft; a first auxiliary power shaft; a second auxiliary power shaft; and a reduction gearbox having gears drivingly connecting the core output shaft, the first auxiliary power shaft and the second auxiliary power shaft to the power output shaft; a first electric machine connected to the second auxiliary power shaft of the first engine; a second electric machine connected to the second auxiliary power shaft of the second engine; and a mechanical connexion drivingly connecting the first auxiliary power shaft of the first and second turboprop engines to one another.

The gears can include a first reduction stage including a first gear supported concentrically by a first stage shaft, the first stage shaft having an output gear, the core output shaft having a core output gear radially offset from a first rotation axis of the first stage shaft and drivingly meshed with the first gear, the auxiliary power shaft having an auxiliary power gear radially offset from the first rotation axis and drivingly meshed with the first gear, the auxiliary power gear being circumferentially offset from the power output gear relative the first rotation axis, the first stage shaft, core output shaft and auxiliary power shaft being parallel to one another.

The gears can further include an epicyclic gearing, the epicyclic gearing drivingly connecting the core output shaft, the first auxiliary power shaft and the second auxiliary power shaft to the power output shaft; wherein the epicyclic gearing of one of the first and second turboprop engine reverses an angular rotation direction between the auxiliary power shaft and the power output shaft.

The epicyclic gearing can have a sun gear having a first rotation axis, the sun gear configured to receive power from at least one of the core output shaft and the auxiliary power shaft, a ring gear concentric to the sun gear relative the first rotation axis, a plurality of planet gears individually drivingly meshed between the sun gear and the ring gear, the planet gears circumferentially interspaced from one another around the first rotation axis, a planet carrier individually rotatably receiving each one of the planet gears and holding rotation axes of the planet gears fixed relative to one another, wherein a first one of the planet carrier and the ring gear is secured to a housing of the reduction gearbox and a second one of the planet carrier and the ring gear is made integral to the power output shaft.

A clutch can be provided between the engine core and the core output shaft, the clutch operable to selectively engage or disengage the core output shaft and the engine core.

The gears can include a first gear having a rotation axis, wherein the first auxiliary power shaft, the second auxiliary power shaft and the core output shaft are parallel to one another and to the rotation axis and have corresponding gears being individually meshed to the first gear and circumferentially distributed around the first gear.

The gears can include a first gear having a rotation axis, wherein the first auxiliary power shaft, the second auxiliary power shaft and the core output shaft are parallel to one another and to the rotation axis and have corresponding gears, the core output shaft gear and a first one of the first and second auxiliary power shaft gears being individually meshed to the first gear and a second one of the first and second auxiliary power shaft gears being drivingly connected to the first gear via the first one of the first and second auxiliary power shaft gears.

The engine core can have, in fluid flow communication, an inlet, a compressor section, a combustor section, a turbine section and an exhaust section, the core output shaft being drivingly connected to the turbine section.

In accordance with another aspect, there is provided a method of operating a gas turbine engine system having a first turboprop engine and a second turboprop engine supported by wings on opposite sides of a fuselage, each of said first and second turboprop engines having an engine core, a core output shaft drivable by the engine core, a power output shaft bearing a propeller, a first auxiliary power shaft; a second auxiliary power shaft, a reduction gearbox having gears drivingly connecting the core output shaft, the first auxiliary power shaft and the second auxiliary power shaft to the power output shaft, and an electric machine drivingly connected to the second auxiliary power shaft, wherein a mechanical connexion drivingly connects the first auxiliary power shaft of the first and second turboprop engines to one another, the method comprising: the engine core of the first turboprop engine and the electric machine of the second turboprop engine simultaneously and collectively driving both the propeller of the first turboprop engine and of the second turboprop engine including conveying power between the reduction gearboxes via the mechanical connexion.

The method can further include, simultaneously, the electric machine of the first turboprop engine driving both the propeller of the first turboprop engine and of the second turboprop engine including conveying power between the reduction gearboxes via the mechanical connexion.

The method can further include maintaining the engine core pf the second turboprop engine disengaged from the reduction gearbox of the second turboprop engine while performing said simultaneous and collective driving.

DESCRIPTION OF THE DRAWINGS

Reference is now made to the accompanying figures in which.

DETAILED DESCRIPTION

Figure 1:
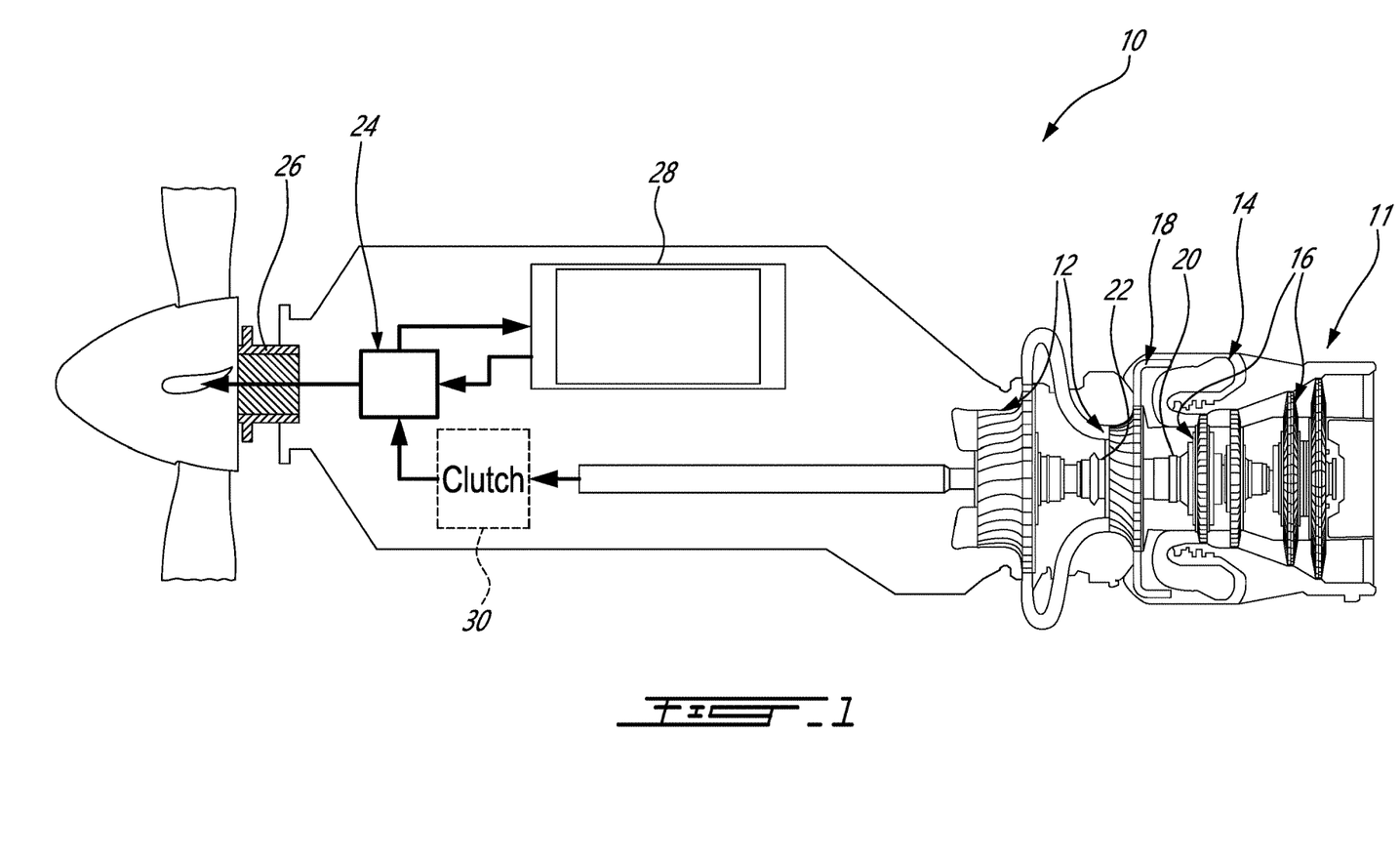
FIG. 1 is a schematic cross-sectional view of a gas turbine engine.

FIG. 1 illustrates an example of a turbine engine. In this example, the turbine engine 10 is a turboprop engine having an engine core 11 generally comprising in serial flow communication, a multistage compressor 12 for pressurizing the air, a combustor 14 in which the compressed air is mixed with fuel and ignited for generating an annular stream of hot combustion gases around the engine axis, and a turbine section 16 for extracting energy from the combustion gases. The turbine engine terminates in an exhaust section.

The fluid path extending sequentially across the compressor 12, the combustor 14 and the turbine 16 can be referred to as the core gas path 18. In the embodiment shown in FIG. 1, the turboshaft engine 10 has two turbine stages, including a high pressure stage associated to a high pressure shaft 20 drivingly connected to the compressor, and a low pressure stage associated to a low pressure shaft 22. The low pressure shaft 22 is used as a power source during use.

Turboprop engines, similarly to turboshaft engines, typically have some form of gearing by which the power of the low pressure shaft 22 is transferred to an external shaft 26 bearing blades or a propeller. This gearing, is typically used to reduce a rotation speed of the low pressure shaft to the rotation speed of the power output shaft in accordance with a predetermined ratio, and can be referred to as a reduction gearbox 24 for the sake of simplicity.

As presented below in greater detail in relation with a number of different embodiments, in some cases, one or more secondary power source 28 can be connected to the power output shaft 26 through the reduction gearbox 24. In some embodiments, the secondary power source 28 can be used to supplement the power delivered by the engine core 11. In some embodiments, the secondary power source 28 can be used as a sole source of power for driving the power output shaft 26, and can thus selectively be used instead of the engine core 11 to drive the power output shaft 26. In embodiments where the secondary power source 28 can be used as sole source of power for driving the power output shaft 26, it can be preferred to include a clutch 30 which can selectively engage or disengage the reduction gearbox 24 from the engine core 11. Indeed, the clutch 30 can disengage the reduction gearbox 24 from the engine core 11 to avoid aerodynamic losses associated to rotating the compressor 12 and turbine 16 of the engine core 11 when the rotation is not required. In some embodiments, and as will be presented in further detail below, it can be desired to configure the reduction gearbox 24 in a manner to allow not only receiving power from the secondary power source 28, but also delivering power through the same port, such as for diverting power from the engine core 11. In this embodiment, the clutch 30 is an over-running clutch, or sprag clutch, but it will be understood that other types of clutches can be used in other embodiment.

Figure 2:
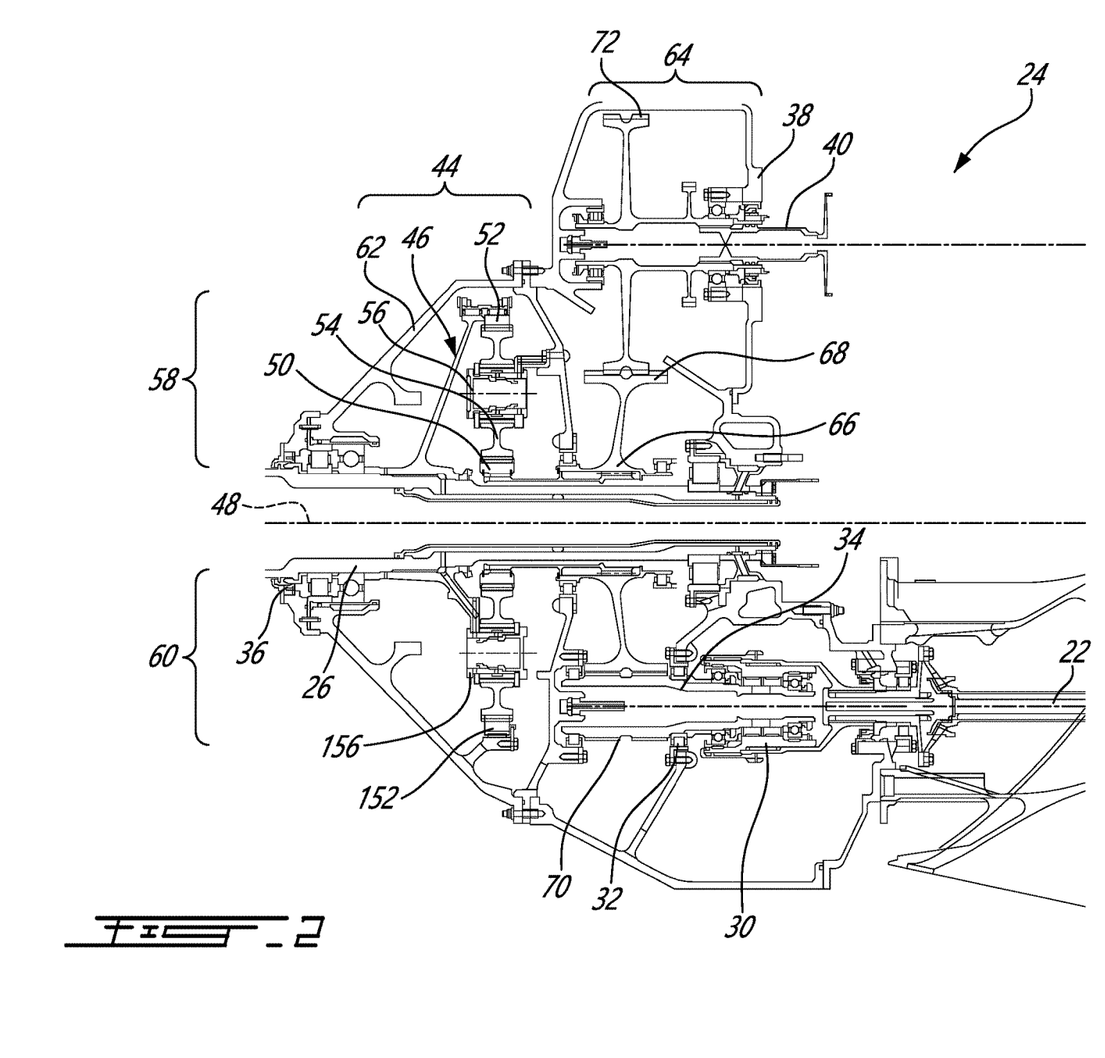
FIG. 2 is a schematic cross-sectional view of a reduction gearbox in accordance with an embodiment.

Referring to FIG. 2, an example reduction gearbox 24 is presented. The reduction gearbox 24 can be provided with an input port 32 configured for receiving a core output shaft 34 which is drivable by the engine core 11. In this embodiment, the core output shaft 34 is connected to the low pressure shaft 22 of the engine core 11 via a clutch 30. The reduction gearbox 24 can further be provided with an output port 36 configured for receiving a power output shaft 26, and an auxiliary port 38 receiving an auxiliary power shaft 40 which can be drivingly connected to the secondary power source 28. Depending on the embodiment, the auxiliary power shaft 40 can be connected to an auxiliary power shaft 124 of another engine 110 (see FIG. 3) via a mechanical connexion 42 for instance (e.g. in a configuration such as shown in FIG. 4), or be connected to an electric machine which can operate either as a generator or as an electric motor, to give a few examples. Moreover, in some embodiments, more than one auxiliary power shaft 40 can connect into a same reduction gearbox to connect to more than one secondary power source. Depending on the embodiment, the nature of the mechanical connexion 42 can take various forms, such as involving gears and shafts, pneumatic power transfer, hydraulic power transfer, etc.

Figure 3:
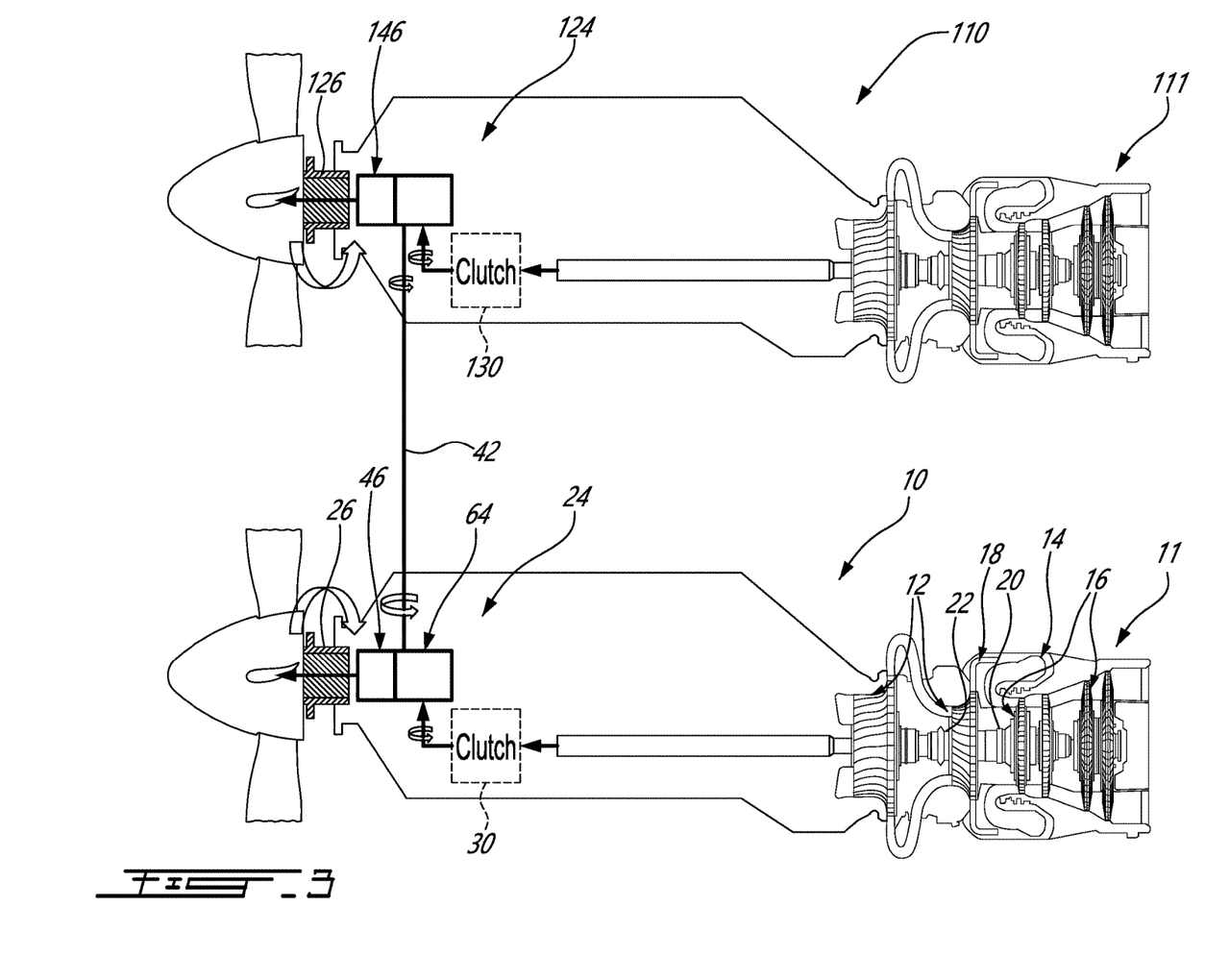
FIG. 3 is a schematic view of an engine system having two turboprop engines in accordance with an embodiment.
Figure 4:
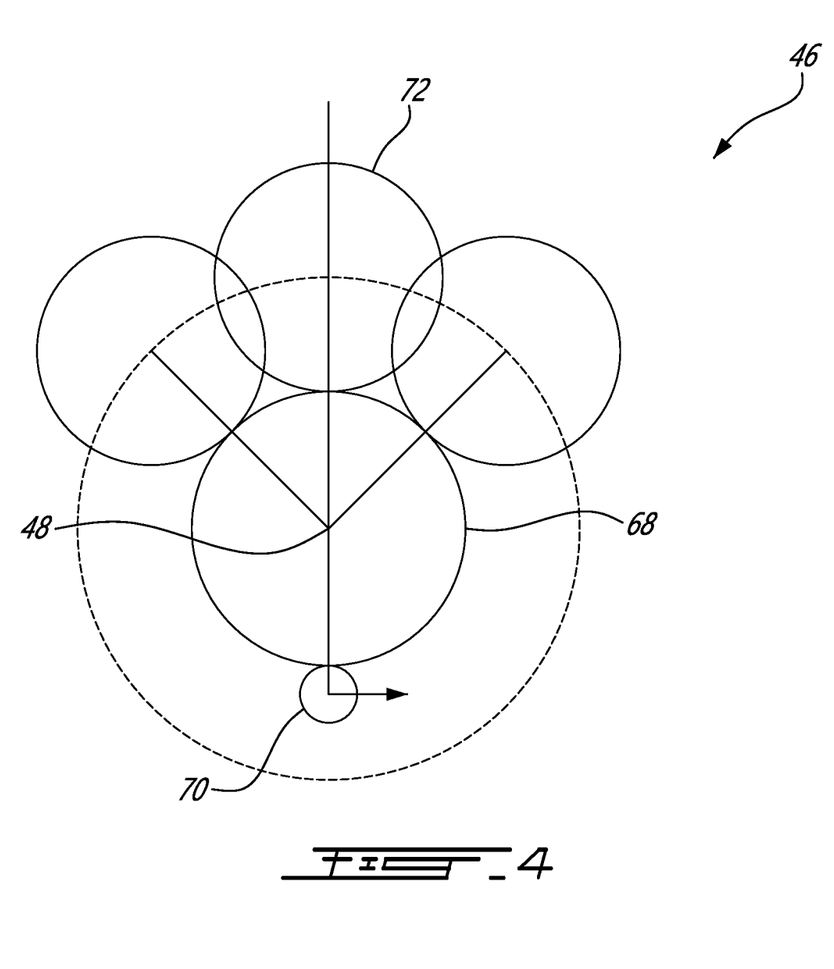
FIG. 4 is a schematic transversal cross-sectional view of a $1^{st}$ reduction stage in accordance with an embodiment.

FIG. 3 presents an embodiment of a twin turboprop gas turbine engine system including a first engine 10 and a second engine 110. The reduction gearbox 24 of the first engine 10 is mechanically connected to transfer power with the reduction gearbox 124 of the second engine 110. The mechanical connection can be referred to as a mechanical connexion 42. The reduction gearboxes 24, 224 can be similar. The mechanical connexion 42 can include the auxiliary power shaft 40 of the first engine and an auxiliary power shaft of the second engine 110. Accordingly, the engine core 111 of the second engine 110 can constitute a secondary power source of the first engine 10 and the engine core 11 of the first engine 10 can constitute a secondary power source of the second engine 110. Accordingly, the auxiliary power shaft 40 of each engine can be used to receive power from the other engine 110 to drive the power output shaft 26.

In some aircraft, such as the aircraft equipped with twin turboprop engines 10, 110 illustrated in FIG. 3 for instance, it can be desired to rotate the power output shaft 26, 126 of two engines 10, 110 in opposite directions. However, many aircraft components, such as many engine cores and some electric machines, are manufactured either as a left-handed or a right-handed model. In a left-handed core engine 11, the low pressure shaft 22 can rotate clockwise, whereas in a right-handed model, the low pressure shaft can be designed to rotate counter-clockwise, for example. The same can be true for the main shaft of a right-handed or left-handed electrical machine and other aircraft components such as power sources or auxiliary equipment for instance. In the case of some aircraft components, manufacturing both left-handed and right-handed models can represent a significant burden or inconvenience whether from the point of view of design, manufacturing, or inventory management, and there can be a strong incentive to manufacture a given component either as left-handed or right-handed, but not both. This incentive can come into competition with the need of providing some aircraft with engines having opposite power output shaft 26, 126 rotation directions. One way of addressing this need is to provide a reduction gearbox 24 with a reduction stage 44 consisting of epicyclic gearing.

FIG. 2 presents an example of a reduction gearbox 24 having a reduction stage 44 consisting of epicyclic gearing 46. Epicyclic gearing 46 typically involves four main components operating around a main rotation axis 48. A central gear, referred to as a sun gear 50, is positioned centrally, in alignment with the rotation axis 48. A ring gear 52 having a larger diameter than the sun gear 50 is positioned concentrically with the sun gear 50. A plurality of "planet" gears 54 are individually meshed between the ring gear 52 and the sun gear 50. The planet gears 54 are circumferentially interspaced from one another around the main axis 48 and have individual rotation axes around which they revolve, and which can revolve around the main axis 48 either relative to the sun gear 50 or relative to the ring gear 52 depending of a configuration of the epicyclic gearing 46. The planet gears 54 are rotatably mounted to a planet carrier 56 which maintains the relative position of the planet gears 54 relative to one another around the main axis 48.

The example reduction gearbox 24 presented in FIG. 2 has a reduction stage 44 consisting of epicyclic gearing 46. FIG. 2 schematically represents two potential configurations of an otherwise identical epicyclic gearing 46. A selection of one of these two configurations can be made to either inverse the rotation direction between the input and the output, or preserve the rotation direction between the input and the output. A first one of these configurations, which can be referred to herein as a star configuration 58, is presented above the main rotation axis 48, and a second one of these configurations, which can be referred to herein as a planet configuration 60, is presented below the main rotation axis 48. This representation is schematic and in a given engine, either the star configuration 58 or the planet configuration 60 can be chosen. In the star configuration 58, the planet carrier 56 is fixed to the housing 62 and the power output shaft 26 is made integral to the ring gear 52, such as by being assembled to the ring gear or otherwise manufactured from a same component, without internally moving parts. In the planet configuration 60, the ring gear 152 is secured to the housing 62, and the planet carrier 156 is made integral to the power output shaft 26. In the planet configuration 60, the rotation direction is preserved between the sun gear 50 and the power output shaft 26, whereas in the star configuration 58 the rotation direction is reversed. Accordingly, by simply selecting a star or planet configuration for the epicyclic gearing 46, the rotation of the power output shaft 26 can be selected while keeping all other components uniquely left handed or right handed. It will be noted that other embodiments are possible. For instance, in the embodiment presented in FIG. 2, the sun gear 50 is used for power input. In an alternate embodiment, the planet carrier or the ring gear could be used for power input, and the sun gear could be used for power output or be secured to the housing 62.

In this embodiment, the epicyclic gearing 46 is a second gear stage, or second stage of speed reduction, and the gears of the reduction gearbox 24 further has a series of first stage reduction gears referred to herein as a first gear stage 64. The first gear stage 64 can have a first stage shaft 66 which rotates around a first rotation axis. In this embodiment, the first rotation axis coincides with the main rotation axis 48 of the epicyclic gearing 46. The first stage shaft 66 has a first gear 68. The first stage shaft 66 further has the sun gear 50 in this embodiment, and is hollow in a manner that the power output shaft 26 extends through it and is supported by bearings at both opposite ends of the reduction gearbox housing 62. The core output shaft 34 has a core output gear 70 having a rotation axis which is radially offset from the first rotation axis 48. The core output gear 70 is meshed with and thus directly drivingly engaged with the first gear 68. The auxiliary power shaft 40 has an auxiliary power gear 72 having a rotation axis which is also radially offset from the first rotation axis 48. The auxiliary power gear 72 is meshed with and thus directly drivingly engaged with the first gear 68 (and thus, indirectly, with the core output gear 70). The auxiliary power shaft 40, the core output shaft 70 and the first rotation axis 48 are parallel in this embodiment. The auxiliary power shaft 40 is drivingly connected to the core output shaft 70 via the first gear 68. Both the auxiliary power shaft 40 and the core output shaft 70 are drivingly connected to the power output shaft 26 via the first gear 68 and the epicyclic gearing 46.

As can be seen perhaps better in FIG. 4, the auxiliary power gear 72 is circumferentially spaced apart from the core output gear 70 relative the first axis 48. The first stage 64 can be a reduction stage and a reduction ratio can be determined by a difference in diameter between different ones of the gears. In particular, the diameter of the core output gear 70 can be smaller than the diameter of the first gear 68. When the diameter of the core output gear 70 is smaller, the core output gear 70 will make more than one turn before the first gear 68 completes a turn, resulting in a first reduction of rotation speed. Similarly, a reduction ratio can exist between the auxiliary power gear 72 and the first gear 68 as deemed most relevant to a given embodiment. In the illustrated embodiment, the reduction ratio between the core output gear 70 and the first gear 68 is high, and the reduction ratio between the auxiliary power gear 72 and the first gear 68 is low. In this embodiment, the epicyclic gearing 46 also has a reduction ratio and can thus be referred to as a reduction stage. In the embodiment presented in FIG. 2, the epicyclic gearing 46 is used after the first reduction stage 64 and can thus be referred to as a second reduction stage.

As shown in FIG. 2, the core output shaft 34 and the auxiliary power shaft 40 can be said to be radially offset from the first axis 48. In this embodiment, the core output shaft 34 is positioned below, or at 6 O'clock, relative to the first rotation axis 48, whereas the auxiliary power shaft 40 is positioned above, or at 12 O'clock, relative to the first rotation axis 48. In alternate embodiments different circumferential positions can be selected, as is schematically shown for the auxiliary power gear 72 in FIG. 4.

FIG. 3 shows a gas turbine engine system having two engines 10, 110, such as can be used in a twin turboprop aircraft for instance. A mechanical connexion 42 drivingly connects the auxiliary power shaft 40 of the first engine 10 to the auxiliary power shaft (not shown) of the second engine 110. The first engine 10 has an epicyclic gearing 46 in a first one of the star 58 and planet 60 configurations whereas the second engine has an epicyclic stage 146 in a second one of the star 58 and planet 60 configurations. Accordingly, while both engine cores 11, 111 are right handed, the output shafts 26, 126, and the associated propellers, rotate in different directions when both engines 10, 110 are operated. If one engine fails or is intentionally operated at idling for fuel efficiency purposes, for instance, the failed or idling engine can be decoupled from its reduction gearbox by the corresponding clutch 30, 130, and the other engine can be used to drive both propellers in opposite orientations via the mechanical connexion 42 and the different epicyclic gearing configurations.

Figure 5:
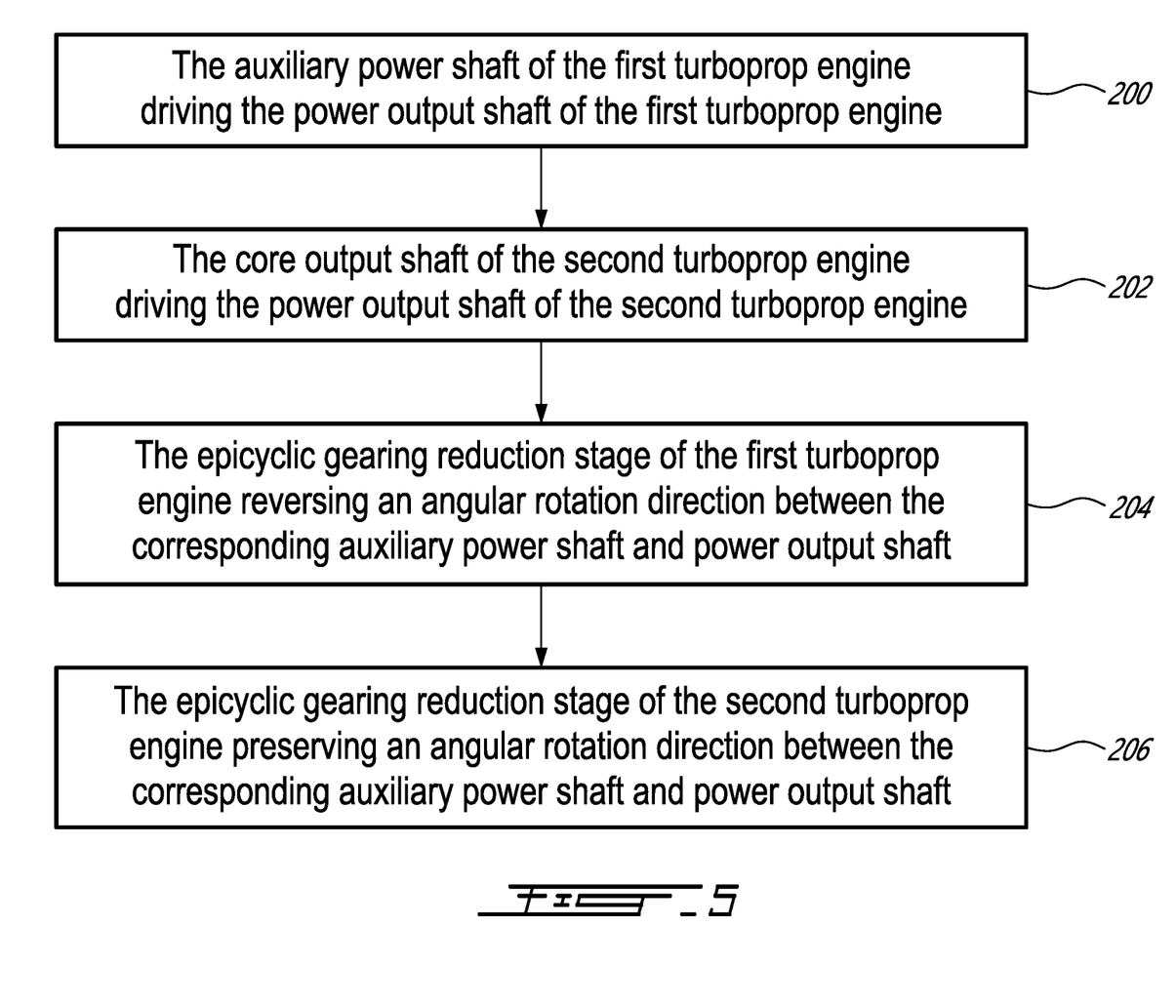
FIG. 5 is a flowchart of a method of operating a gas turbine engine in accordance with an embodiment.

Accordingly, as represented in FIG. 5, in one example mode of operation, the auxiliary power shaft 40 of the first turboprop engine 10 drives 200 the power output shaft 26 of the first turboprop engine 10; the core output shaft of the second turboprop engine 110 drives 202 the power output shaft 126 of the second turboprop engine 110; the epicyclic gearing reduction stage 46 of the first turboprop engine 10 reverses 204 an angular rotation direction between the corresponding auxiliary power shaft 40 and power output shaft 26; the epicyclic gearing reduction stage 146 of the second turboprop engine 110 preserves 206 an angular rotation direction between the corresponding auxiliary power shaft and power output shaft 126.

Figure 6:
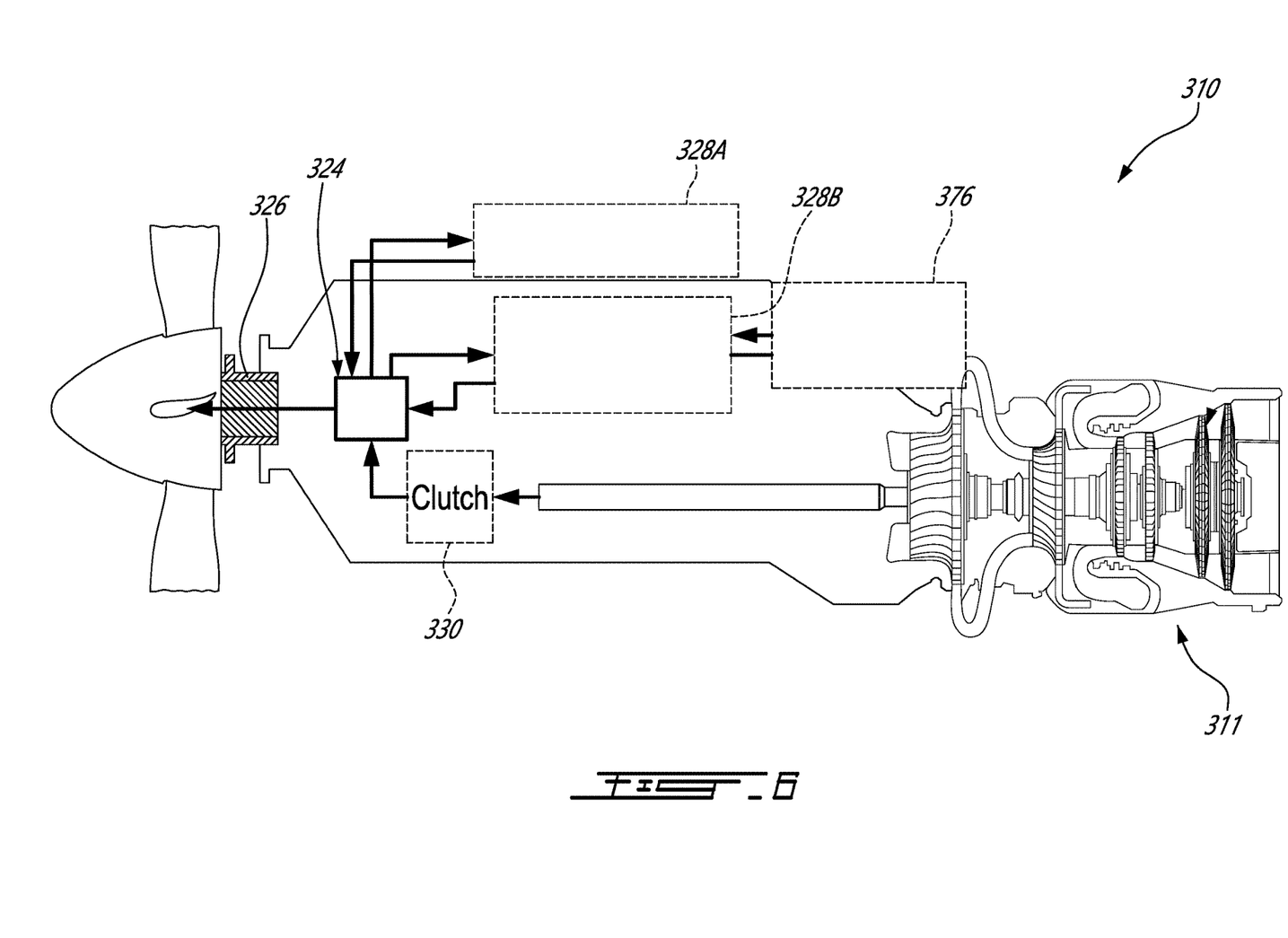
FIG. 6 is a schematic cross-sectional view of a gas turbine engine in accordance with an embodiment.

Turning now to FIG. 6, another embodiment will be presented where two secondary sources of power 328A, 328B can be connected to the reduction gearbox 324. In this example, the first secondary power source 328A is an electric machine which can be connected to an electric power storage device 376 (e.g. batteries) with electrical wiring. The electric machine 328A can be operated as a generator to store electrical power in the electric power storage device 376 when operating conditions are favourable to storing, or operated as an electric motor to drive the power output shaft 326 when operating conditions are favourable to power delivery. In this example, the second secondary power source 328B can be a mechanical connexion leading to a second thermal cycle turbomachinery powerplant, such as via a reduction gearbox 124 of a second engine 110 (see FIG. 4). A clutch 330 may or may not be present between the reduction gearbox 324 and the engine core 311 in such an embodiment. A epicyclic gearing may or may not be present as part of the reduction gearbox 324 in such an embodiment.

Figure 7A:
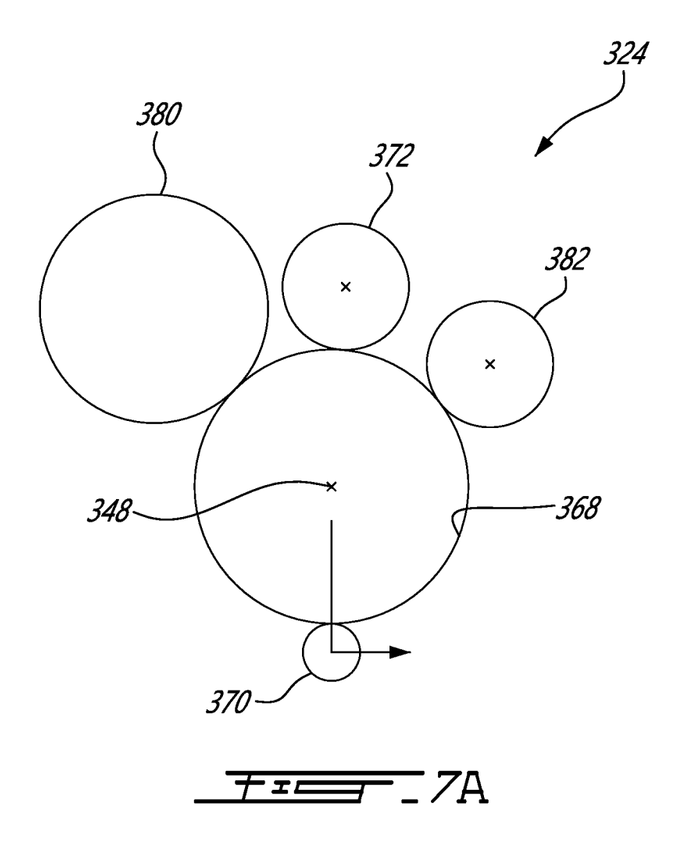
FIGS. 7A and 7B are schematic transversal cross-sectional views of a $1^{st}$ reduction stage in accordance with respective embodiments.

Referring to FIGS. 7A, in an embodiment such as schematized in FIG. 6, a reduction gearbox 324 can have a core output gear 370 defined around a core output shaft, a first auxiliary power gear 372 defined around a first auxiliary power shaft drivingly connected to the first secondary power source 328A. The reduction gearbox 324 can have a first reduction gear 368 meshed and drivingly engaged with both the core output gear 370 and the first auxiliary power gear 372. The reduction gearbox 324 can further have a second auxiliary power gear 380 defined around a second auxiliary power shaft drivingly connected to the second secondary power source 328B. The first auxiliary power gear 372, the second auxiliary power gear 380 and the core output gear 370 can be meshed and drivingly engaged with the first gear 368 which rotates around the first rotation axis 348, and can be circumferentially interspaced from one another around the first rotation axis 348. The arrangement can otherwise be similar to the one shown in FIG. 2 for instance. In the example illustrated in FIG. 7A, a third auxiliary gear 382 can also be present and meshed directly with the first gear 368. The third auxiliary gear 382 can be drivingly connected to yet another secondary power source or to an auxiliary equipment, for instance.

Figure 7B:
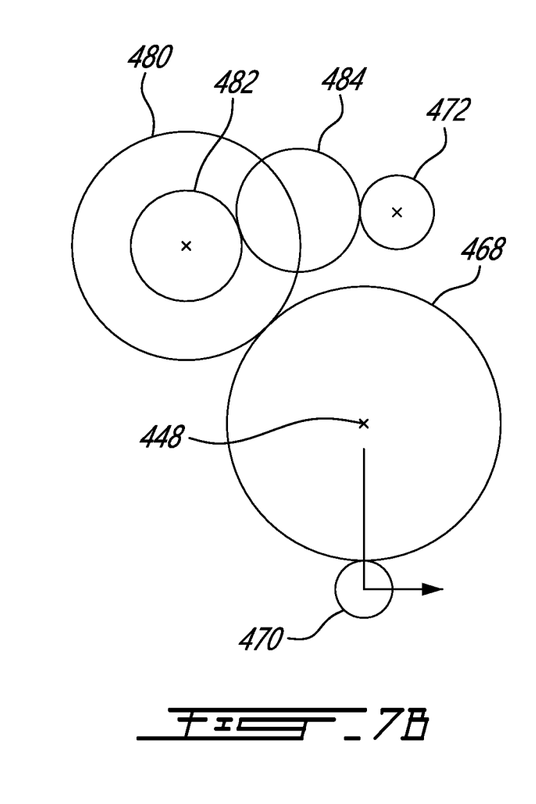

In a second example embodiment represented in FIG. 7B, a first auxiliary power gear 480 and a core output gear 470 can be meshed and drivingly engaged with a first gear 468 rotating around a first rotation axis 448, similarly to as shown in FIG. 7A, while the second auxiliary power gear 472 is drivingly connected to the first gear 468 indirectly, via the first auxiliary power gear 480. More specifically, the first auxiliary power gear 472 can be defined around a first auxiliary power shaft further having, in-line with the first auxiliary power gear 472, an accessory gear 482. An intermediary gear 484 can be meshed directly with both the accessory gear 482 and the second auxiliary power gear 472 and thus serve to transmit power therebetween in addition to allowing to preserve a direction of rotation and potentially allow further rotation ratio adjustment.

Figure 8:
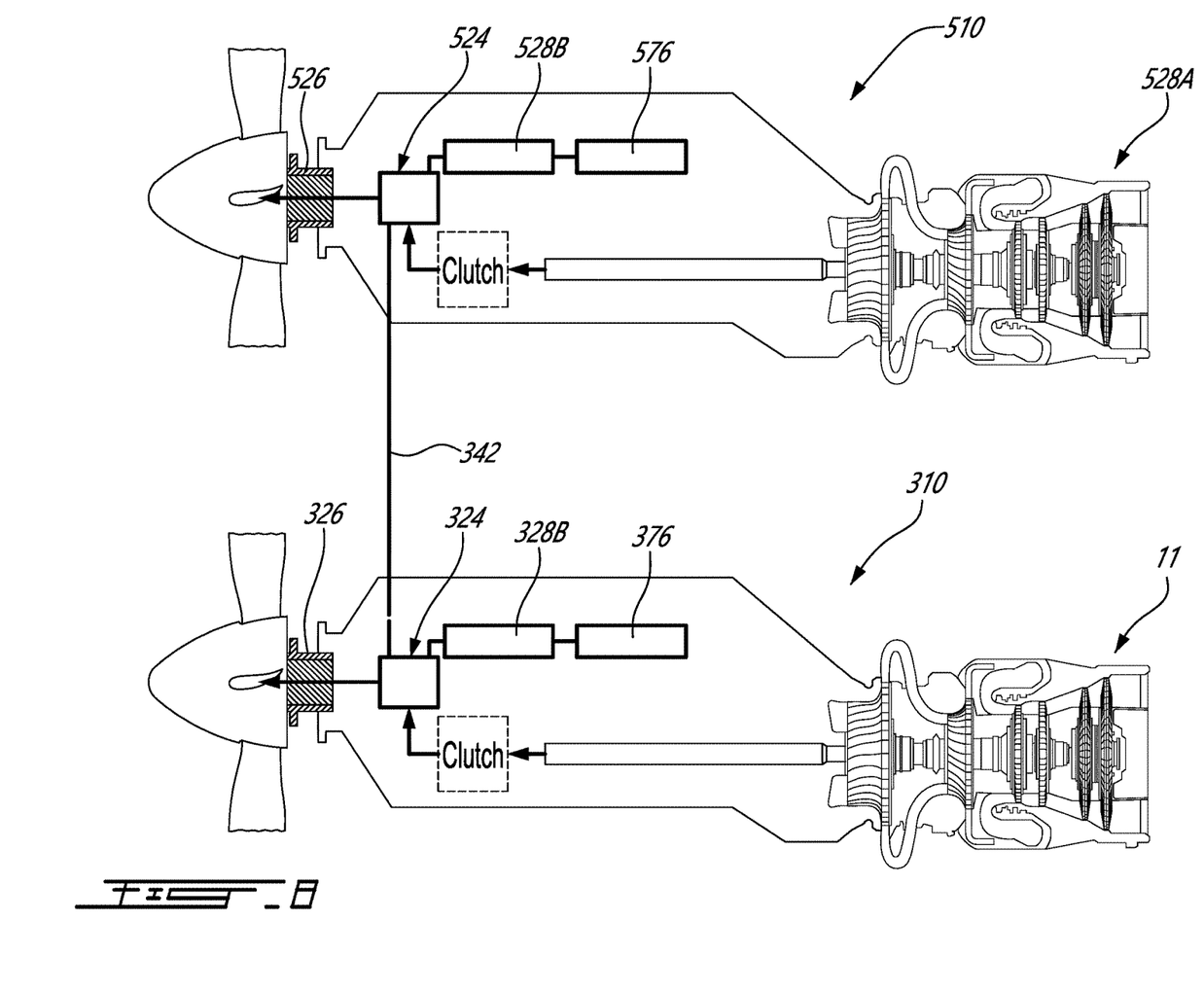
FIG. 8 is a schematic view of an engine system having two turboprop engines in accordance with an embodiment.

FIG. 8 presents yet another embodiment of a gas turbine engine system having two engines 310, 510, which can be used in a twin turboprop aircraft for instance. A mechanical connexion 342 drivingly connects the second auxiliary power gear 380 of the first engine 310 to the auxiliary power shaft of the second engine 510. The mechanical connexion 342 can be connected into the reduction gearbox 324, 524 or both engines via a second auxiliary power gear 380, 480 such as shown in FIG. 7A or 7B for example. Moreover, both engines 310, 510 further have a corresponding electric machine 328B, 528B and a corresponding battery 376, 576. The electric machine 328B, 528B of each engine can be connected into the corresponding reduction gearbox 324, 524 via a first auxiliary power gear 372, 472 such as presented in FIG. 7A or 7B for example. The reduction gearboxes 324, 524 may have a single reduction stage such as presented in FIG. 7A or 7B, or alternately have an additional epicyclic gear stage for example. If one engine 310, 510 fails or is intentionally operated at idling for fuel efficiency purposes, for instance, the other engine can be used to drive both power output shafts 526, 326 and their associated propellers via the mechanical connexion 342. In such operating conditions, one or both electric machines 328B, 528B can be used in electric motor mode to draw power from the corresponding electric power storage 376, 576 to supplement the power provided by the other engine and used to drive both power output shafts 326, 526 in a hybrid fuel/electric mode of operation, or left idle. When operating conditions are considered suitable, one or both electric machines 328B, 528B can be used in generator mode to store excess power into the electric power storage 376, 576 while operating one or both engine cores 11, 528A at a point of high fuel efficiency. In still another embodiment, a single electric machine is used connected to one of the two gearboxes 324, 524.

Upon review of the present disclosure, a person of ordinary skill in the art will recognize that changes may be made to the embodiments described herein without departing from the scope of the present technology. For example, the reduction gearbox arrangements presented herein may be relevant for other gas turbine engine types such as turbofan or turboshaft, even if reduction is not required or relevant for such other applications. Yet further modifications could be implemented by a person of ordinary skill in the art in view of the present disclosure, which modifications would be within the scope of the present technology.

The invention claimed is:

1. A gas turbine engine comprising:
    an engine core;
    a core output shaft drivable by the engine core;
    a power output shaft;
    an auxiliary power shaft; and
    a reduction gearbox having an input port operatively connected to the core output shaft, an output port operatively connected to the power output shaft, an auxiliary port operatively connected to the auxiliary power shaft, and epicyclic gearing drivingly connecting the core output shaft to the auxiliary power shaft, the epicyclic gearing drivingly connecting the core output shaft and the auxiliary power shaft to the power output shaft;
    wherein the auxiliary power shaft is drivingly connected to another gas turbine engine.

2. The gas turbine engine of claim 1, wherein the epicyclic gearing is a second reduction stage, the reduction gearbox further comprising a first reduction stage including a first gear supported concentrically by a first stage shaft, the first stage shaft having an output gear forming a sun gear of the epicyclic gearing reduction stage, the core output shaft having a core output gear radially offset from a first rotation axis of the first stage shaft and drivingly meshed with the first gear, the auxiliary power shaft having an auxiliary power gear radially offset from the first rotation axis and drivingly meshed with the first gear, the auxiliary power gear being circumferentially offset from the power output gear relative the first rotation axis, wherein the first stage shaft, core output shaft and auxiliary power shaft are parallel to one another.

3. The gas turbine engine of claim 1, wherein the epicyclic gearing has a sun gear having a first rotation axis, the sun gear configured to receive power from at least one of the core output shaft and the auxiliary power shaft, a ring gear concentric to the sun gear relative the first rotation axis, a plurality of planet gears individually drivingly meshed between the sun gear and the ring gear, the planet gears circumferentially interspaced from one another around the first rotation axis, a planet carrier individually rotatably operatively connected to each one of the planet gears and holding rotation axes of the planet gears fixed relative to one another, wherein a first one of the planet carrier and the ring gear is secured to a housing of the reduction gearbox and a second one of the planet carrier and the ring gear is made integral to the power output shaft.

4. The gas turbine engine of claim 1, further comprising a clutch between the engine core and the core output shaft, the clutch operable to engage or disengage the core output shaft and the engine core.

5. The gas turbine engine of claim 1, wherein the auxiliary port is a first auxiliary port and the auxiliary power shaft is a first auxiliary power shaft, further comprising a second auxiliary port operatively connected to a second auxiliary power shaft, the reduction gearbox drivingly connecting the second auxiliary power shaft to the first auxiliary power shaft and the core output shaft.

6. The gas turbine engine of claim 5, wherein the reduction gearbox includes a first gear having a rotation axis, wherein the first auxiliary power shaft, the second auxiliary power shaft and the core output shaft are parallel to one another and to the rotation axis and have corresponding gears being individually meshed to the first gear and circumferentially distributed around the first gear.

7. The gas turbine engine of claim 5, wherein the reduction gearbox includes a first gear having a rotation axis, wherein the first auxiliary power shaft, the second auxiliary power shaft and the core output shaft are parallel to one another and to the rotation axis and have corresponding gears, the core output shaft gear and a first one of the first and second auxiliary power shaft gears being individually meshed to the first gear and a second one of the first and second auxiliary power shaft gears being drivingly connected to the first gear via the first one of the first and second auxiliary power shaft gears.

8. The gas turbine engine of claim 1, wherein the engine core has, in fluid flow communication, an inlet, a compressor section, a combustor section, a turbine section and an exhaust section, the core output shaft being drivingly connected to the turbine section.

9. A gas turbine engine system comprising :
a first turboprop engine and a second turboprop engine supported by wings on opposite sides of a fuselage, each of said first and second turboprop engines having an engine core;
a core output shaft drivable by the engine core;
a power output shaft;
an auxiliary power shaft;
a reduction gearbox having gears drivingly connecting the core output shaft to the auxiliary power shaft, the gears including an epicyclic gearing, the epicyclic gearing drivingly connecting the core output shaft and the auxiliary power shaft to the power output shaft;
the gas turbine engine system further comprising a mechanical connexion drivingly connecting the auxiliary power shaft of the first and second turboprop engines to one another; and
wherein the epicyclic gearing of one of the first and second turboprop engine reverses an angular rotation direction between the auxiliary power shaft and the power output shaft.

10. The gas turbine engine system of claim 9, wherein the epicyclic gearing is a second reduction stage, the gears further comprising a first reduction stage including a first gear supported concentrically by a first stage shaft, the first stage shaft having an output gear forming a sun gear of the epicyclic gearing reduction stage, the core output shaft having a core output gear radially offset from a first rotation axis of the first stage shaft and drivingly meshed with the first gear, the auxiliary power shaft having an auxiliary power gear radially offset from the first rotation axis and drivingly meshed with the first gear, the auxiliary power gear being circumferentially offset from the power output gear relative the first rotation axis, wherein the first stage shaft, core output shaft and auxiliary power shaft are parallel to one another.

11. The gas turbine engine system of claim 9, wherein the epicyclic gearing has a sun gear having a first rotation axis, the sun gear configured to receive power from at least one of the core output shaft and the auxiliary power shaft, a ring gear concentric to the sun gear relative the first rotation axis, a plurality of planet gears individually drivingly meshed between the sun gear and the ring gear, the planet gears circumferentially interspaced from one another around the first rotation axis, a planet carrier individually rotatably operatively connected to each one of the planet gears and holding rotation axes of the planet gears fixed relative to one another, wherein the epicyclic gearing of the first turboprop engine has the planet carrier secured to a housing of the reduction gearbox and the ring gear made integral to the power output shaft and the epicyclic gearing of the second turboprop engine has the ring gear secured to a housing of the reduction gearbox and the planet carrier made integral to the power output shaft.

12. The gas turbine engine system of claim 9, further comprising a clutch between the engine core and the core output shaft, the clutch operable to selectively engage or disengage the core output shaft and the engine core.

13. The gas turbine engine system of claim 9, wherein the auxiliary port is a first auxiliary port and the auxiliary power shaft is a first auxiliary power shaft, further comprising a second auxiliary port operatively connected to a second auxiliary power shaft, the gears drivingly connecting the second auxiliary power shaft to the first auxiliary power shaft and the core output shaft.

14. A method of operating a gas turbine engine system having a first turboprop engine and a second turboprop engine supported by wings on opposite sides of a fuselage, each of said first and second turboprop engines having an engine core, a core output shaft drivable by the engine core, a power output shaft, an auxiliary power shaft and a reduction gearbox interconnecting the core output shaft, power output shaft and auxiliary power shaft, the reduction gearbox having an epicyclic gearing reduction stage, the method comprising :
the auxiliary power shaft of the first turboprop engine driving the power output shaft of the first turboprop engine;
the core output shaft of the second turboprop engine driving the power output shaft of the second turboprop engine;
the epicyclic gearing reduction stage of the first turboprop engine reversing an angular rotation direction between the corresponding auxiliary power shaft and power output shaft; and the epicyclic gearing reduction stage of the second turboprop engine preserving an angular rotation direction between the corresponding auxiliary power shaft and power output shaft.

15. The method of claim 14, wherein the auxiliary power shaft of the first turboprop engine drives the power output shaft of the first turboprop engine while the core output shaft of the second turboprop engine drives the power output shaft of the second turboprop engine.

16. The method of claim 14, further comprising maintaining the core output shaft of the first turboshaft engine disengaged from the engine core of the first turboshaft engine while the auxiliary power shaft of the first turboprop engine drives the power output shaft of the first turboprop engine.

17. The method of claim 14, wherein at least one of the first turboprop engine and the second turboprop engine comprises an electric machine, the method further comprising the electric machine driving the auxiliary power shaft of the first turboprop engine.

18. The method of claim 14, wherein the auxiliary power shaft of the first turboprop engine is driven by the core output shaft of the second turboprop engine.

\* \* \* \* \*